United States Patent
Hong et al.

(10) Patent No.: US 7,289,898 B2
(45) Date of Patent: Oct. 30, 2007

(54) APPARATUS AND METHOD FOR MEASURING SPEED OF A MOVING OBJECT

(75) Inventors: Hyun-Su Hong, Seongnam-si (KR); Jae-Myeon Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/391,595

(22) Filed: Mar. 28, 2006

(65) Prior Publication Data

US 2006/0293826 A1    Dec. 28, 2006

(51) Int. Cl.
*B60T 7/12*    (2006.01)
*G05D 1/00*    (2006.01)
*G06F 7/00*    (2006.01)
*G06F 17/00*   (2006.01)

(52) U.S. Cl. ............ 701/96; 701/38; 701/116; 702/150; 702/152; 702/153; 702/154; 73/503.03; 73/511

(58) Field of Classification Search .......... 701/1, 701/38, 41, 213, 215, 96, 116; 73/488; 29/840, 29/740, 743, 832; 89/41.11, 37.01; 702/150; 340/988; 342/357; 364/566, 449.7
See application file for complete search history.

(56) References Cited

U.S. PATENT DOCUMENTS

| | | | | |
|---|---|---|---|---|
| 4,267,736 A | * | 5/1981 | Westbeck | 74/5.22 |
| 4,531,300 A | * | 7/1985 | Heidel et al. | 33/366.13 |
| 5,265,472 A | * | 11/1993 | Pfeifle et al. | 73/514.02 |
| 5,446,658 A | * | 8/1995 | Pastor et al. | 701/1 |
| 5,774,832 A | * | 6/1998 | Vanderwerf | 701/220 |
| 5,828,987 A | * | 10/1998 | Tano et al. | 702/150 |
| 5,925,087 A | * | 7/1999 | Ohnishi et al. | 701/70 |
| 5,986,583 A | * | 11/1999 | Nakano et al. | 340/988 |
| 6,282,496 B1 | * | 8/2001 | Chowdhary | 701/220 |

(Continued)

OTHER PUBLICATIONS

Jihan Ryu and J. Christian Gerdes□□Estimation of vehicle Roll and Road Bank Angle□□Jun. 30-Jul. 2, 2004□□American Control Conference.*

(Continued)

*Primary Examiner*—Thomas Black
*Assistant Examiner*—Jorge O Peche
(74) *Attorney, Agent, or Firm*—The Farrell Law Firm, P.C.

(57) ABSTRACT

An apparatus and method for measuring the speed of a moving object is provided. A first acceleration along the moving direction of the moving object and a second acceleration along the lateral direction of the moving object are measured. A first angular speed along the lateral direction of the moving object and a second angular speed along the lower direction of the moving object are measured. The roll angle of the moving object using the second acceleration, the second angular speed, and a previous speed of the moving object in the moving direction of the moving object, and a previous road inclination angle with respect to the moving direction of the moving object are calculated. A road inclination angle is calculated using the calculated roll angle, the first angular speed, and the second angular speed. A pure motion acceleration in the moving direction of the moving object is calculated using the calculated road inclination angle and the speed of the moving object is calculated using the pure motion acceleration of the moving object.

16 Claims, 7 Drawing Sheets

U.S. PATENT DOCUMENTS

| | | | |
|---|---|---|---|
| 6,332,104 B1 * | 12/2001 | Brown et al. | 701/1 |
| 6,827,172 B2 * | 12/2004 | Ide et al. | 180/282 |
| 7,057,503 B2 * | 6/2006 | Watson | 340/440 |
| 7,079,928 B2 * | 7/2006 | Lu et al. | 701/38 |
| 7,109,856 B2 * | 9/2006 | Lu et al. | 340/440 |
| 7,136,731 B2 * | 11/2006 | Lu et al. | 701/38 |
| 7,162,343 B2 * | 1/2007 | Subbian et al. | 701/45 |
| 2003/0182041 A1 * | 9/2003 | Watson | 701/45 |
| 2004/0204798 A1 * | 10/2004 | Imada et al. | 701/1 |
| 2006/0041367 A1 * | 2/2006 | Ono et al. | 701/75 |
| 2006/0085111 A1 * | 4/2006 | Kojima | 701/38 |
| 2006/0208169 A1 * | 9/2006 | Breed et al. | 250/221 |
| 2006/0235575 A1 * | 10/2006 | Brown et al. | 701/1 |
| 2006/0293826 A1 * | 12/2006 | Hong et al. | 701/96 |

OTHER PUBLICATIONS

M. Arndt and E. L. Ding and T. Massel◻◻Observer Based Diagnosis of Roll Rate Sensor◻◻Jun. 30-Jul. 2, 2004◻◻American Control Conference.*

Yoshifumi Tanaka and Akio Yamada◻◻Development of Field Furrow Mobile Robot◻◻Sep. 12-16, 1994◻◻ Intelligent Robots and Systems '94. 'Advanced Robotic Systems and the Real World', IROS '94. Proceedings of the IEEE/RSJ/GI International Conference on◻◻.*

◻◻Inclination Sensing of Moving Vehicle◻◻Mar. 12, 2003◻◻MEMSIC.*

* cited by examiner

APPARATUS AND METHOD FOR MEASURING SPEED OF A MOVING OBJECT

PRIORITY

This application claims priority under 35 U.S.C. § 119 to an application entitled "Apparatus and Method for Measuring Speed of Moving Object" filed in the Korean Intellectual Property Office on May 13, 2005 and assigned Serial No. 2005-40359, the contents of which are incorporated herein by reference.

BACKGROUND OF THE INVENTION

1. Field of the Invention

The present invention generally relates to an apparatus and method for measuring the speed of a moving object, and in particular, to an apparatus and method for measuring the speed of these moving objects based on a roll angle.

2. Description of the Related Art

Generally, moving objects such as vehicles, ships, and aircrafts have an embedded navigation system that determines the position of the moving object (positioning), routes a path to a given destination (routing), and provides the routing results.

In order to determine the position of a moving object and provide a path to the destination, navigation systems should be able to determine the exact position of a vehicle. Therefore, navigation systems generally include a positioning device for position determination. Such positioning devices are classified into two types, one for determining the position using an outside source and the other for determining the position using an inside sensor. A Global Positioning System (GPS) is an example of the former type of positioning device. A Dead Reckoning (DR) system using an inertial sensor is an example of the latter type of positioning device.

A DR system calculates the speed and position of a moving object using a gyroscope for detecting a rotational motion of the moving object and an accelerometer for detecting a straight-line motion of the moving object. In particular, the speed of the moving object can be calculated using both speed information acquired from an acceleration measured by the accelerometer and moving direction information acquired from the gyroscope.

In general, the DR system measures the moving direction angle of a vehicle on a road and an acceleration in the moving direction of the vehicle, as well as calculates the moving speed vector of the vehicle using the moving direction angle of the vehicle and the acceleration in the moving direction of the vehicle. In order to measure the moving direction of the vehicle, the DR system requires a gyroscope installed on an axis perpendicular to a plane on which wheel axles (axis of axles) are placed and In order to measure the acceleration in the moving direction of the vehicle, the DR system requires the measurement value of a road inclination angle in addition to an accelerometer installed in the direction of the wheel axle (axis of axle).

The road inclination angle measurement value is required because a specific force component proportional to gravitational acceleration is included in the output of the accelerometer and the specific force component may be calculated from the road inclination angle. Since gravitational acceleration works perpendicularly to the surface of the earth spheroid (a spherical surface perpendicular to the directions of the gravitational acceleration) at all times, the angle of the axis of the accelerometer mounted in the vehicle (fixed in a particular direction within the vehicle) with respect to the surface of the earth spheroid changes, thereby resulting in a change in the specific force component included in the output of the accelerometer.

In other words, if the road inclination angle changes, the direction of the axis of the accelerometer mounted in the vehicle is not perpendicular to the direction of gravitational acceleration. Thus, the accelerometer measures a rate of change in the actual speed of motion (an actual motional acceleration) including a component of gravitational acceleration.

Figure 1:
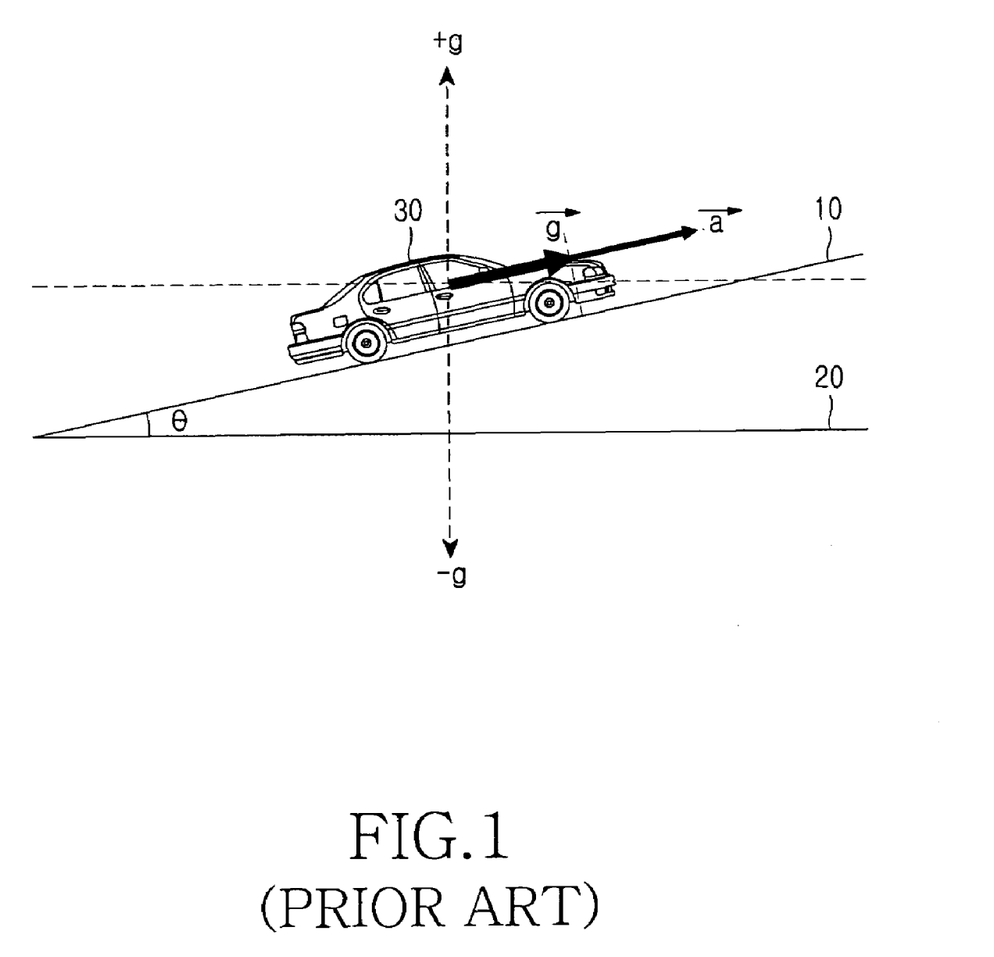
FIG. 1 is a view explaining a component of a gravitational acceleration included in the acceleration of a moving object.

FIG. 1 is a view explaining a component of the gravitational acceleration included in the acceleration of a moving object. Referring to FIG. 1, a road inclination angle is inclined with respect to a plane perpendicular to the direction (±g) of the gravitational acceleration. In FIG. 1, an angle between a plane 20 perpendicular to the direction (±g) of the gravitational acceleration and a plane 10 extending in the moving direction of a vehicle 30 is a road inclination angle θ. When the vehicle 30 travels on the plane 10 inclined at the road inclination angle θ with respect to the plane 10 perpendicular to the direction (±g) of the gravitational acceleration as shown in FIG. 1, a measurement value $\vec{a}$ of an accelerometer mounted in the vehicle 30 includes an actual acceleration and a component of a gravitational acceleration $\vec{g}$. Thus, the component of the gravitational acceleration $\vec{g}$ is also measured together with a rate of change in the actual speed of motion and may cause a big error in the measurement of speed.

Thus, for accurate speed measurement, a vehicle DR system must subtract the gravitational acceleration $\vec{g}$ from the measurement value $\vec{a}$ of the accelerometer and measures the road inclination angle θ to measure the gravitational acceleration $\vec{g}$.

The DR system for vehicles can measure the road inclination angle θ using a rotational angle with respect to the forward direction of a vehicle, a rotational angle with respect to the lateral direction of the vehicle perpendicular to the forward direction of the vehicle, and a rotational angle and a roll angle φ with respect to the lower direction of the vehicle perpendicular to the forward direction and the lateral direction of the vehicle. The roll angle φ means the amount of inclination of the vehicle with respect to the forward direction of the vehicle.

Figure 2A:
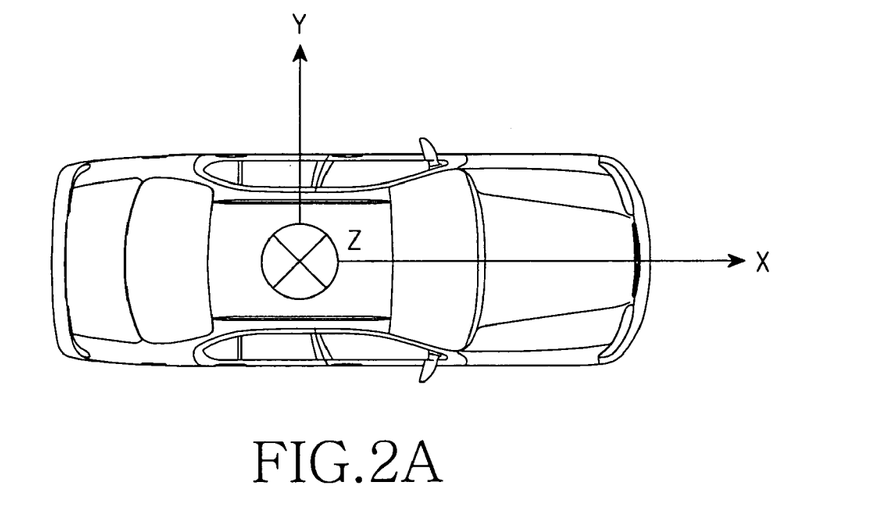
FIGS. 2A and 2B illustrates coordinate axes defined in a moving object.
Figure 2B:
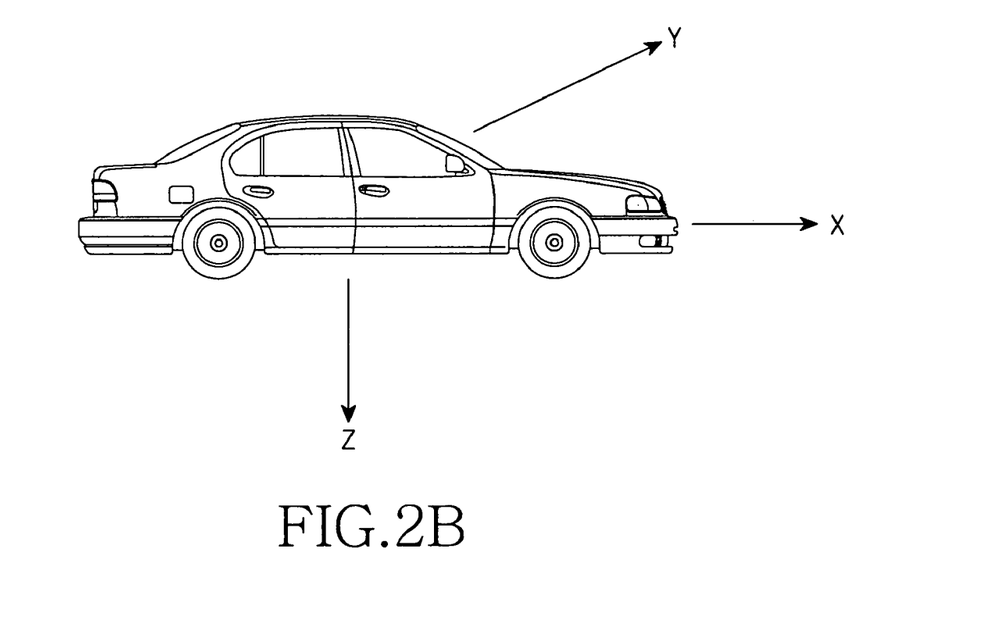

FIG. 2 illustrates coordinate axes defined in a moving object. In FIGS. 2A and 2B, an axis along the forward direction of a vehicle is defined as an X axis, an axis perpendicular to the X axis and passing through the lateral sides of the vehicle is defined as a Y axis, and an axis perpendicular to an XY plane along the lower direction of the vehicle is defined as a Z axis.

Referring to FIG. 2, a rate of change in the road inclination angle θ can be expressed in Equation (1) as follows:

$$\dot{\theta} = \omega_Y \cos\phi - \omega_Z \sin\phi, \quad (1)$$

where $\omega_Y$ is an angular speed along the Y axis, $\omega_Z$ is an angular speed along the Z axis, and φ is the roll angle of the vehicle. At this time, the roll angle φ means the angle of inclination of the vehicle along the X axis.

The change rate of the roll angle φ can be expressed in Equation (2) as follows:

$$\underset{\phi}{E} = \omega_X + \omega_Y \sin\phi \tan\theta - \omega_Z \cos\phi \tan\theta, \quad (2)$$

where $\omega_X$ is an angular speed along the X axis. Equations (1) and (2) are well-known relational expressions related to the change rate of an Euler angle.

Referring to Equation (2), to accurately calculate the change rate $$\underset{\phi}{E}$$

of the roll angle φ, three axis gyroscopes are required for measuring the angular speed $\omega_X$ along the X axis, the angular speed $\omega_Y$ along the Y axis, and the angular speed $\omega_Z$ along the Z axis.

However, generally, a roll motion that is a rotational motion with respect to a wheel axle (axis of axle) (the X axis) connecting the front and rear sides of the vehicle and a straight line motion with respect to an axis (the Z axis) perpendicular to the ground surface is negligible during driving of the vehicle. Thus, conventionally, the road inclination angle θ is calculated only using the angular speed $\omega_X$ along the X axis and the angular speed $\omega_Y$ along the Y axis, irrespective of the roll angle φ and the angular speed $\omega_Z$ along the Z axis in Equation (2).

When the roll angle φ and the angular speed $\omega_Z$ along the Z axis are neglected, i.e., they are assumed to be 0, Equation (1) is $$\underset{\theta}{E} = \omega_r \cos\theta - \theta E \sin\theta$$

and the change rate $$\underset{\theta}{E} = \omega_r, \quad (3)$$

of the roll angle φ can be given as in Equation (3) by:

$$\underset{\phi}{E}$$

where $\omega_r$ can be calculated from the output of a gyroscope that measures an angular speed along an axis (the Y axis) passing through the lateral sides perpendicular to the forward direction of the vehicle and the road inclination angle θ is obtained by integrating $\omega_r$.

However, when there are many curves on the road and thus the roll angle of the vehicle increases, the roll angle of the vehicle has a significant influence upon the road inclination angle. In addition, when the angular speed $\omega_Z$ along the Z axis is large in Equation (1), even if the roll angle of the vehicle is not large, the roll angle of the vehicle has a significant influence upon the road inclination angle. As a result, a conventional calculation of the road inclination angle θ, which neglects the roll angle of the vehicle, has a significant error.

In other words, in the case where the roll angle of the vehicle has a large influence upon the road inclination angle, the road inclination angle calculated using Equation (3) neglecting the roll angle of the vehicle has a difference with the actual road inclination angle, which increases over time. As a result, there are large differences between measured speed and position and actual speed and position. Thus, the road inclination angle should be calculated based on the roll angle of the vehicle.

In Equation (2), gyroscopes for the X axis, the Y axis, and the Z axis are required to calculate the change rate $$\underset{\phi}{E}$$

of the roll angle φ based on the roll angle

φ. However, to use the gyroscope for three axes, additional gyroscopes must be mounted in a DR system, increasing the manufacturing cost of the DR system for measuring the speed of the vehicle.

SUMMARY OF THE INVENTION

It is, therefore, an object of the present invention to provide an apparatus and method for measuring the speed of a moving object based on roll movement.

It is still another object of the present invention to provide an apparatus and method for measuring the speed of a moving object based on roll movement by using an accelerometer, instead of additionally mounting gyroscopes.

To achieve one aspect of the present invention, there is provided an apparatus for measuring the speed of a moving object. The apparatus includes accelerometers, gyroscopes, a roll angle calculator, an inclination angle calculator, and a speed calculator. The accelerometers measure a first acceleration along the moving direction of the moving object and a second acceleration along the lateral direction of the moving object. The gyroscopes measure a first angular speed along the lateral direction of the moving object and a second angular speed along the lower direction of the moving object. The roll angle calculator calculates the roll angle of the moving object using the second acceleration, the second angular speed, a previous speed of the moving object in the moving direction of the moving object, and a previous road inclination angle with respect to the moving direction of the moving object. The inclination angle calculator calculates a road inclination angle using the calculated roll angle, the first angular speed, and the second angular speed. The speed calculator calculates pure motion acceleration in the moving direction of the moving object using the calculated road inclination angle and calculates the speed of the moving object using the pure motion acceleration of the moving object.

To achieve another aspect of the present invention, there is also provided a method for measuring the speed of a moving object. The method includes the steps of measuring a first acceleration along the moving direction of the moving object and a second acceleration along the lateral direction of the moving object, measuring a first angular speed along the lateral direction of the moving object and a second angular speed along the lower direction of the moving object, calculating the roll angle of the moving object using the second acceleration, the second angular speed, a previous speed of the moving object in the moving direction of the moving object, and a previous road inclination angle with respect to the moving direction of the moving object, calculating a road inclination angle using the calculated roll angle, the first angular speed, and the second angular speed, and calculating a pure motion acceleration in the moving direction of the moving object using the calculated road inclination angle and calculating the speed of the moving object using the pure motion acceleration of the moving object.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described in detail with reference to the annexed drawings. In the following description, a detailed description of known functions and configurations incorporated herein has been omitted for conciseness.

An apparatus for measuring the speed of a moving object according to the present invention calculates the roll angle of the moving object using two axis gyroscopes and two axis accelerometers and measures the speed of the moving object based on the calculated roll angle.

Figure 3:
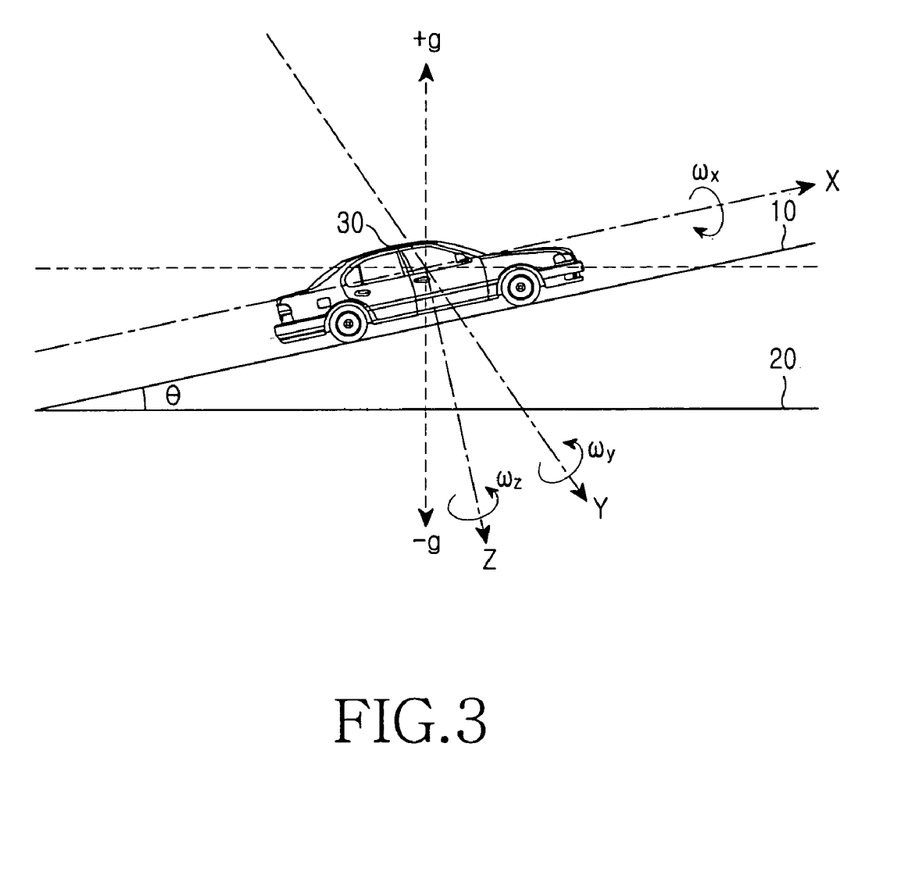
FIG. 3 is a view explaining an arrangement of a gyroscope and an accelerometer in a moving object according to the present invention.

FIG. 3 is a view explaining an arrangement of a gyroscope and an accelerometer in a moving object according to the present invention. In FIG. 3, a moving object is a vehicle.

Referring to FIG. 3, an X axis is a wheel axis connecting the front and rear sides of the vehicle and is in parallel with the moving direction of the vehicle. A Y axis is perpendicular to the moving direction of the vehicle and passes through the lateral sides of the vehicle. A Z axis is perpendicular to the X axis and the Y axis and connects the top and the bottom of the vehicle.

According to the present invention, the apparatus for measuring the speed of a moving object includes two gyroscopes that are located on the Y axis and the Z axis perpendicularly to each other, and two accelerometers located on the X axis and the Y axis also perpendicularly to each other.

A Y-axis gyroscope located on the Y axis measures the angular speed $\omega_Y$ along the Y axis and a Z-axis gyroscope located on the Z axis measures the angular speed $\omega_Z$ along the Z axis. An X-axis accelerometer located on the X axis measures an acceleration $f_X$ along the X axis and a Y-axis accelerometer located on the Y axis measures an acceleration $f_Y$ along the Y axis.

When the constant of the gravitational acceleration is assumed to be g, the acceleration $f_X$ along the X axis calculated by the X-axis accelerometer is expressed in Equation (4) as follows:

$$f_X = a_X + g \sin\theta - \omega_Z V_Y + \omega_Y V_Z \qquad (4),$$

where $a_X$ is an actual motion acceleration component of a moving object along the X axis, g is the constant of the gravitational acceleration, $g \sin\theta$ is a gravitational acceleration component, and $-\omega_Z V_Y + \omega_Y V_Z$ is an acceleration component caused by a rotational motion of the moving object. The acceleration $f_y$ along the Y-axis calculated by the Y-axis accelerometer is expressed in Equation (5) as follows:

$$f_Y = a_Y - g \sin\phi \cos\theta + \omega_Z V_X + \omega_X V_Z \qquad (5);$$

where $a_Y$ is an actual motion acceleration component of a moving object along the Y axis, g is the constant of the gravitational acceleration, $-g \sin\theta\phi \cos\theta$ is a gravitational acceleration component, and $\omega_Z V_X + \omega_X V_Z$ is an acceleration component caused by a rotational motion of the moving object.

In Equations (4) and (5), $\omega_X$ is an angular speed along the X axis, $\omega_Y$ is an angular speed along the Y axis, $\omega_Z$ is an angular speed along the Z axis, $V_X$ is a speed component along the X axis, $V_Y$ is a speed component along the Y axis, and $V_Z$ is a speed component along the Z axis. "Since the vehicle nearly moves along a straight line in the direction of the X axis Vy and Vz in equation (4) are close to 0. Thus when Vy and Vz are assumed to be 0, the acceleration fx along the X axis is expressed in Equation (6) as follows:."

$$f_X = a_X + g \sin\theta \qquad (6)$$

In order to acquire a gravitational acceleration component $g \sin\theta$ included in the acceleration $f_X$ along the X axis in Equation (6), the road inclination angle $\theta$ should be calculated first.

The road inclination angle $\theta$ can be calculated by integrating Equation (1), i.e., $$\dot{\underline{E}}_\theta = \omega_Y \cos\phi - \omega_Z \sin\phi.$$

By integrating Equation (1), the road inclination angle $\theta$ at a time instant t is induced and expressed in Equation (7) as follows:

$$\theta = \theta_0 + \int_0^{\theta'}(\omega_Y \cos\phi - \omega_Y \sin\phi)dt, \qquad (7)$$

where $\theta_0$ is the initial value of $\theta$.

In order to calculate the road inclination angle $\theta$ in Equation (7), the roll angle $\phi$ should be acquired first. The roll angle $\phi$ can be calculated using Equation (5). When the acceleration component $a_Y$ along the Y axis is assumed to be 0 in Equation (5), Equation (5) can be arranged as expressed in Equation (8) as follows:

$$f_Y = -g \sin\phi \cos\theta + \omega_Z V_X + \omega_X V_Z \qquad (8)$$

$f_Y$ can be expressed as in Equation (9) for the roll angle $\phi$ as follows:

$$\phi(\sin^{-1}[(-f_Y+\omega_Z V_X)/g\cos\theta]) \quad (9),$$

where $f_Y$ uses a measurement value of the Y-axis accelerometer, $\omega_Z$ uses a measurement value of the Z-axis gyroscope, a speed $V_X$ along the X axis and the road inclination angle $\theta$ use their immediately previous estimates. The immediately previous estimates mean previous estimates $V_X$ and $\theta$. When there is no immediately previous estimate, predetermined initial values may be used.

By using the immediately previous estimates $V_X$ and $\theta$ in Equation (9), the roll angle $\phi$ can be given by Equation (10) as follows:

$$\hat{\phi}=\sin^{-1}[(-f_Y+\omega_Z \hat{V}_X)/g\cos\hat{\theta}] \quad (10)$$

By substituting a calculated roll angle estimate $\hat{\theta}$ into Equation (1), a road inclination angle change rate $\hat{\theta}$ is expressed in Equation (11) as follows:

$$\hat{\theta}=\omega_Y \cos\hat{\theta}-\omega_Z \sin\hat{\phi} \quad (11)$$

By substituting a measurement value $\omega_Y$ of the Y-axis gyroscope and a measurement value $\omega_Z$ of the Z-axis gyroscope into Equation (11), the road inclination angle change rate $\hat{\theta}$ is calculated and is then integrated with respect to a time axis to acquire the road inclination angle $\theta$.

The gravitational acceleration component $g\sin\theta$ included in the acceleration measurement value $f_X$ along the X axis in Equation (6) can be acquired using the calculated road inclination angle $\theta$.

By subtracting the gravitational acceleration component $g\sin\theta$ from the acceleration $f_X$ along the X axis, a pure motion acceleration of the moving object along the X axis is acquired as expressed in Equation (12) as follows:

$$a_X=f_X-g\sin\theta \quad (12)$$

By integrating the pure motion acceleration $a_X$ acquired using Equation (12) with respect to the time axis, a pure speed $V_X$ of the moving object along the X axis can be acquired.

Thus, the apparatus for measuring the speed of a moving object according to the present invention can accurately measure a pure motion speed of the moving object using the principles described above.

Figure 4:
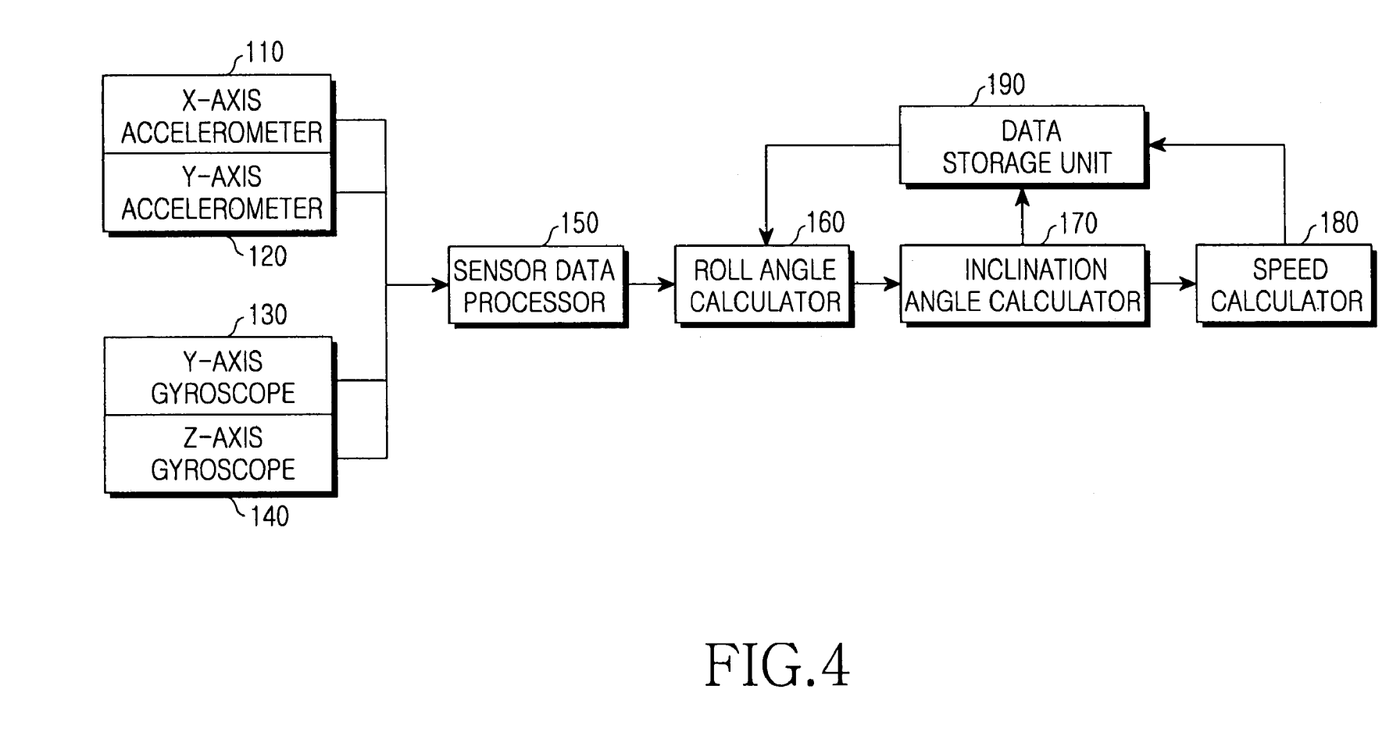
FIG. 4 is a block diagram of an apparatus for measuring the speed of a moving object according to the present invention.

Hereinafter, the configuration of the apparatus for measuring the speed of a moving object according to the present invention will be described in detail below. FIG. 4 is a block diagram of an apparatus for measuring the speed of a moving object according to the present invention. Referring to FIG. 4, the apparatus includes an X-axis accelerometer 110, a Y-axis accelerometer 120, a Y-axis gyroscope 130, a Z-axis gyroscope 140, a sensor data processor 150, a roll angle calculator 160, an inclination angle calculator 170, a speed calculator 180, and a data storage unit 190.

The X-axis accelerometer 110 measures a first acceleration, i.e., the acceleration $f_X$ along the X axis. The Y-axis accelerometer 120 measures a second acceleration, i.e., the acceleration $f_Y$ along the Y axis. The Y-axis gyroscope 130 measures a first angular speed, i.e., the angular speed $\omega_Y$ along the Y axis. The Z-axis gyroscope 140 measures a second angular speed, i.e., the angular speed $\omega_Z$ along the Z axis.

The sensor data processor 150 processes the acceleration measurement values $f_X$ and $f_Y$ output from the X-axis accelerometer 110 and the Y-axis accelerometer 120 and the angular speed measurement values $\omega_Y$ and $\omega_Z$ output from the Y-axis gyroscope 130 and the Z-axis gyroscope 140. In other words, the sensor data processor 150 corrects the acceleration measurement values $f_X$ and $f_Y$ and the angular speed measurement values $\omega_Y$ and $\omega_Z$ and provides correction data to the roll angle calculator 160.

The roll angle calculator 160 calculates the roll angle $\phi$ of a moving object using the acceleration measurement value $f_Y$ along the Y axis, the angular speed measurement value $\omega_Z$ along the Z axis, a previous speed $V_X$ along the X axis, and a previous road inclination angle $\theta$. In other words, the roll angle calculator 160 arranges Equation (5) for the acceleration $f_Y$ measured by the Y-axis gyroscope 130 to Equation (9) for the roll angle $\phi$. The roll angle calculator 160 calculates the roll angle $\phi$ by substituting the acceleration measurement value $f_Y$ along the Y axis, the angular speed measurement value $\omega_Z$ along the Z axis, the previous speed $V_X$ along the X axis, and the previous road inclination angle $\theta$ into Equation (9). At this time, the previous speed $V_X$ along the X axis and the previous road inclination angle $\theta$ are immediately previous estimates. The immediately previous estimates mean previous estimates $V_X$ and $\theta$. When there is no immediately previous estimate, predetermined initial values may be used.

The inclination angle calculator 170 calculates the road inclination angle $\theta$ using the roll angle $\phi$ calculated by the roll angle calculator 160, the angular speed $\omega_Y$ measured by the Y-axis gyroscope 130, and the angular speed $\omega_Z$ measured by the Z-axis gyroscope 140. In other words, the inclination angle calculator 170 acquires Equation (10) for the roll angle $\phi$ using immediately previous estimates $V_X$ and $\theta$ and calculates a road inclination angle change rate using Equation (11) by substituting Equation (10) into Equation (1). The inclination angle calculator 170 substitutes the calculated roll angle $\phi$, the angular speed $\omega_Y$ measured by the Y-axis gyroscope 130, and the angular speed $\omega_Z$ measured by the Z-axis gyroscope 140 into Equation (11) and integrates the road inclination angle change rate with respect to the time axis, thereby calculating the road inclination angle $\theta$.

The speed calculator 180 calculates an accurate speed of the moving object using the road inclination angle $\theta$ calculated by the inclination angle calculator 170 and the acceleration measurement value $f_X$ along the X axis. In other words, the speed calculator 180 calculates the gravitational acceleration component $g\sin\theta$ in Equation (6) for the acceleration $f_X$ by using the road inclination angle $\theta$. The speed calculator 180 subtracts the gravitational acceleration component $g\sin\theta$ from the acceleration measurement value $f_X$, thereby calculating the pure motion acceleration of the moving object along the X axis as in Equation (12).

The data storage unit 190 stores the road inclination angle $\theta$ calculated by the inclination angle calculator 170 and the pure speed $V_X$ of the moving object calculated by the speed calculator 180 and provides the stored previous road inclination angle $\theta$ and the stored previous pure speed $V_X$ of the moving object to the roll angle calculator 160. Thus, the roll angle calculator 160 can calculate the roll angle $\phi$ using the acceleration measurement value $f_Y$, the angular speed measurement value $\omega_Z$, the previous pure speed $V_X$, and the previous road inclination angle $\theta$.

Figure 5:
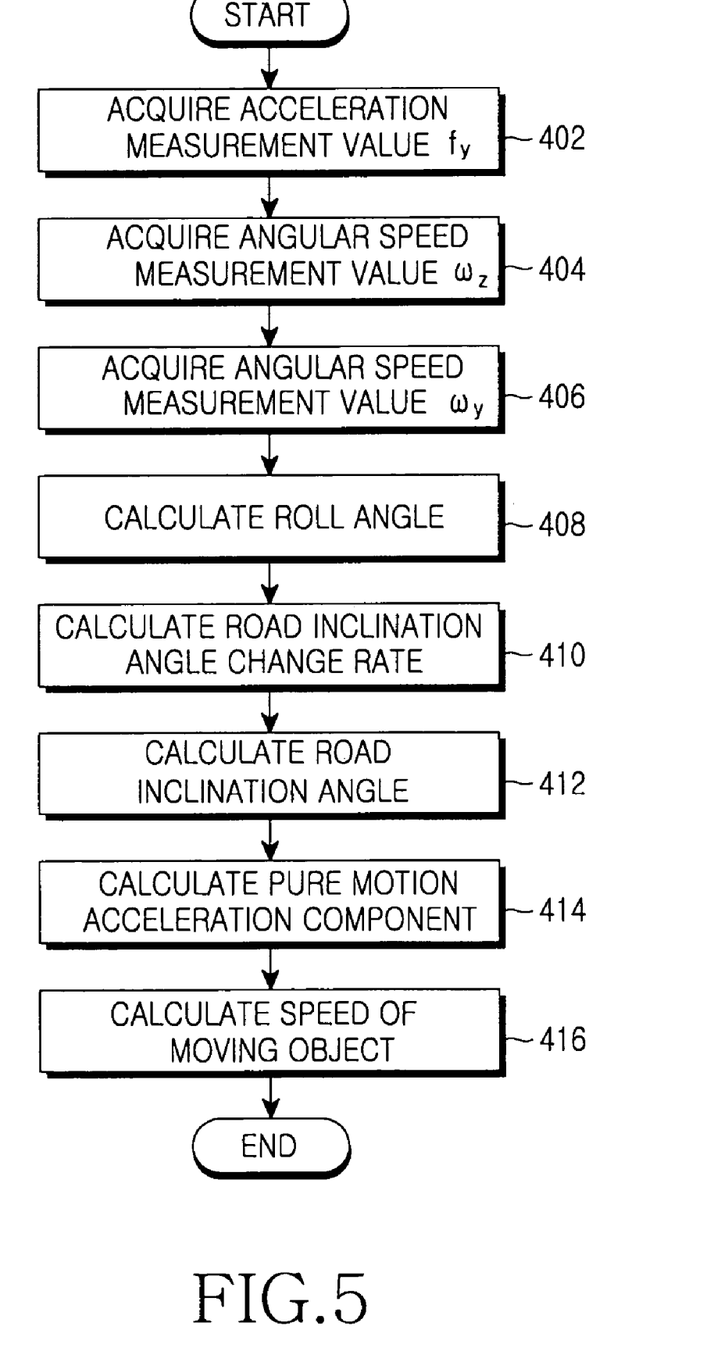
FIG. 5 is a flowchart illustrating a method for measuring the speed of a moving object according to the present invention.

Hereinafter, a method for measuring the speed of a moving object according to the present invention will be described in detail. FIG. 5 is a flowchart illustrating a method for measuring the speed of a moving object according to the present invention. Referring to FIG. 5, the acceleration measurement value $f_Y$ is acquired in step 402 of FIG. 5. The acceleration measurement value $f_Y$ is acquired by the Y-axis accelerometer 120 and indicates the amount of change in a speed along an axis (the Y axis) perpendicular to an axis (the X axis) along the forward direction of the moving object and passing through the lateral sides of the moving object.

In step 404 of FIG. 5, the angular speed measurement value $\omega_Z$ is acquired. The angular speed measurement value $\omega_Z$ is acquired by the Z-axis gyroscope 140 and indicates an angular speed along an axis (the Z axis) perpendicular to an XY plane along the lower direction of the moving object.

In step 406 of FIG. 5, the angular speed measurement value $\omega_Y$ is acquired. The angular speed measurement value $\omega_Y$ is acquired by the Y-axis gyroscope 130 and indicates an angular speed along an axis (the Y axis) passing through the lateral sides of the moving object.

After the acceleration measurement value $f_Y$ and the angular speed measurement values $\omega_Z$ and $\omega_Y$ are acquired, the roll angle $\phi$ is calculated in step 408 of FIG. 5. Simply, the roll angle $\phi$ of the moving object is calculated using the acquired acceleration measurement value $f_Y$, the angular speed measurement value $\omega_Y$, the previous speed $V_X$ along the X axis, and the previous road inclination angle $\theta$. An equation for the acceleration measurement value $f_Y$ acquired by the Y-axis gyroscope 130 is arranged to an equation for the roll angle $\phi$. The roll angle $\phi$ is then calculated by substituting the acceleration measurement value $f_Y$, the angular speed measurement value $\omega_Y$, the previous speed $V_X$ along the X axis, and the previous road inclination angle $\theta$ into the equation for the roll angle $\phi$. At this time, the speed $V_X$ along the X axis and the road inclination angle $\theta$ are immediately previous estimates. The immediately previous estimates are the previous estimates $V_X$ and $\theta$. When there is no immediately previous estimate, predetermined initial values may be used.

After calculation of the roll angle X, the road inclination change rate is calculated in step 410 of FIG. 5. In other words, Equation (10) for the roll angle $\phi$ is acquired using the immediately previous estimates $V_X$ and $\theta$ and the road inclination change rate is calculated using Equation (11) acquired by substituting Equation (10) into Equation (1).

In step 412 of FIG. 5, the road inclination change rate is integrated with respect to the time axis, thereby calculating the road inclination angle $\theta$. In step 414 of FIG. 5, pure motion acceleration is calculated by subtracting a gravitational acceleration component from the acceleration measurement value $f_X$ along the X axis. In other words, the gravitational acceleration component $g \sin \theta$ is calculated using the calculated road inclination angle $\theta$ and the pure motion acceleration $a_X$ is calculated by subtracting the gravitational acceleration component from the acceleration measurement value $f_X$.

In step 416 of FIG. 5, the pure speed $V_X$ of the moving object along the X axis is calculated by integrating the pure motion acceleration $a_X$ with respect to the time axis.

In other words, according to the present invention, the speed of a moving object can be accurately measured based on the roll angle of the moving object.

FIGS. 6A, 6B, 7A and 7B illustrate the speeds of a moving object measured according to prior art and according to the present invention. In FIGS. 6 and 7, the speed of a moving object measured irrespective of the roll angle of the moving object according to prior art and the speed of the moving object measured based on the roll angle of the moving object according to the present invention are compared to the speed (V-GPS) of the moving object measured using a GPS.

Such comparisons are performed because the speed of the moving object measured using a GPS has a small error when compared to an actual speed of the moving object. Thus, in the present invention, it is assumed that the speed of the moving object measured using a GPS is an actual speed of the moving object.

Figure 6A:
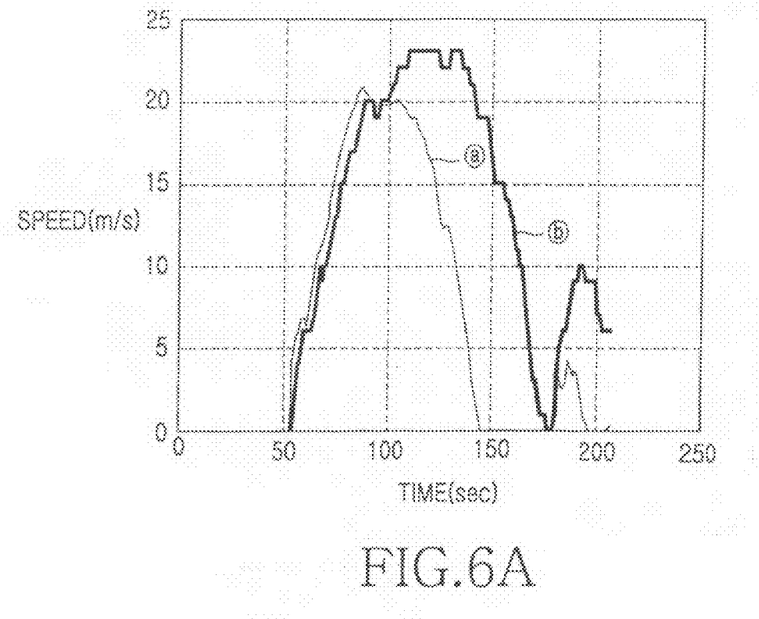
FIGS. 6A, 6B, 7A and 7B illustrate the measured speeds of a moving object according to prior art and according to the present invention.

As a first comparison result, referring to FIG. 6A, it shows a graph of the speed of a moving object measured irrespective of the roll angle of the moving object according to prior art and a graph of the speed of the moving object measured using a GPS. In FIG. 6A, the horizontal axis indicates a time axis (sec.) and the vertical axis indicates a speed axis (m/s). In FIG. 6A an encircled 'a' indicates the speed (V-GPS) of the moving object measured using the GPS and an encircled 'b' indicates the speed (V-DR) of the moving object measured irrespective of the roll angle of the moving object according to prior art. Referring to FIG. 6A, when the roll angle of the moving object is neglected according to prior art, the speed (V-DR) measured according to prior art has a large difference from the speed (V-GPS) measured using the GPS. Thus, it can be seen that measurement of the speed of the moving object irrespective of the roll angle has a significant error.

Figure 6B:
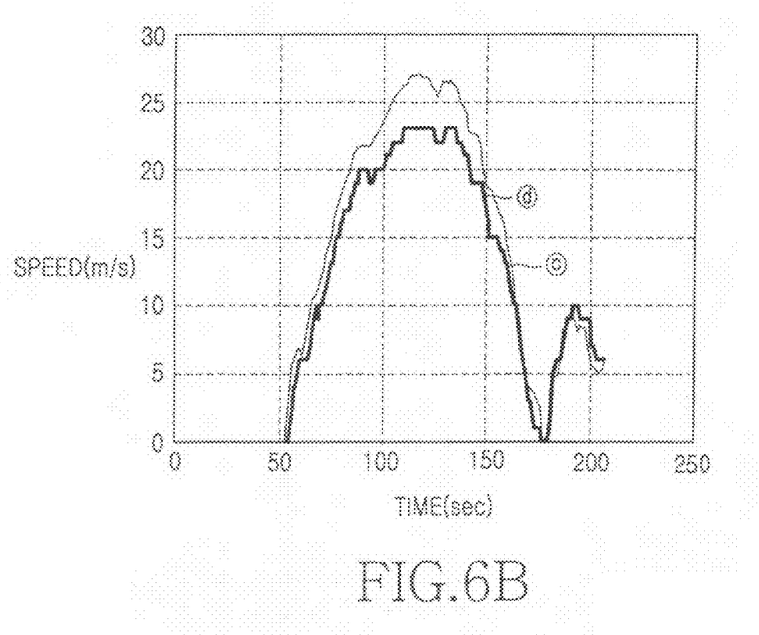

Referring to FIG. 6B, it shows a graph of the speed of a moving object measured based on the roll angle of the moving object according to the present invention and a graph of the speed of the moving object measured using a GPS. In FIG. 6B, an encircled 'a' indicates the speed (V-GPS) of the moving object measured using the GPS and an encircled 'c' indicates the speed (V'-DR) of the moving object measured based on the roll angle of the moving object according to the present invention. Referring to FIG. 6B, the speed (V'-DR) measured according to the present invention has a small difference from the speed (V-GPS) measured using the GPS. Thus, a speed that is almost the same as the actual speed of the moving object can be acquired by measuring the speed of the moving object based on the roll angle of the moving object.

Figure 7A:
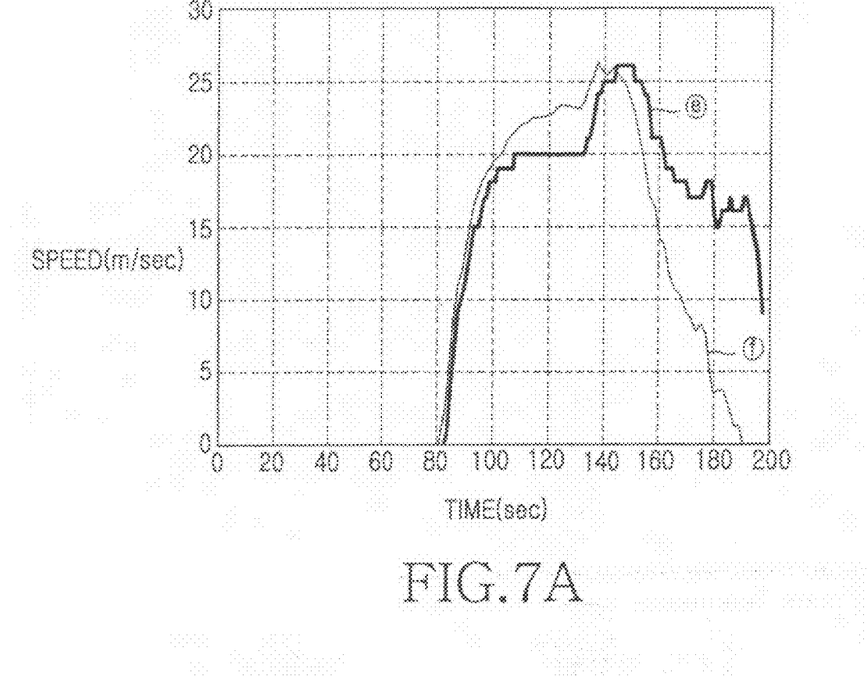

As a second comparison result, referring to FIG. 7A, it shows a graph of the speed of a moving object measured irrespective of the roll angle of the moving object according to prior art and a graph of the speed of the moving object measured using a GPS. In FIG. 7A, an encircled 'd' indicates the speed (V-GPS) of the moving object measured using the GPS and (e) (circled-'e') encircled 'e' indicates the speed (V-DR) of the moving object measured irrespective of the roll angle of the moving object according to prior art.

Figure 7B:
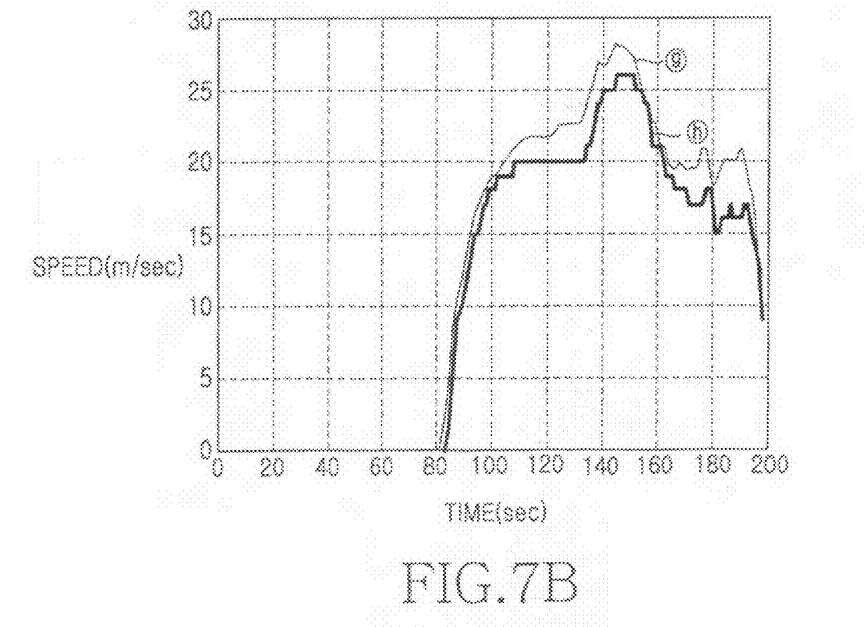

Referring to FIG. 7B, it shows a graph of the speed of a moving object measured based on the roll angle of the moving object according to the present invention and a graph of the speed of the moving object measured using a GPS. In FIG. 7B, (d) an encircled 'd' indicates the speed (V-GPS) of the moving object measured using the GPS and an encircled 'f' indicates the speed (V'-DR) of the moving object measured based on the roll angle of the moving object according to the present invention.

When FIGS. 7A and 7B are compared, a performance difference between measurement of the speed of the moving object irrespective of the roll angle of the moving object and measurement of the speed of the moving object based on the roll angle of the moving object can be seen. In other words, when the speed of the moving object is measured based on the roll angle of the moving object according to the present invention, a speed measurement error is small and a speed that is almost the same as the actual speed of the moving object can be acquired.

As described above herein, according to the present invention, the speed of the moving object can be accurately measured based on the roll angle of the moving object.

In addition, already mounted accelerometers are used without further mounting of expensive and bulky gyroscopes for measurement based on the roll angle of the moving object, thereby reducing the manufacturing cost of a DR system.

Furthermore, by accurately measuring the speed of the moving object, accuracy in positioning of the moving object using the speed of the moving object can be improved.

While the present invention has been shown and described with reference to a preferred embodiment thereof, it will be understood by those skilled in the art that various changes in form and details may be made therein without departing from the spirit and scope of the invention.

What is claimed is:

1. An apparatus for measuring the speed of a moving object using a Dead Reckoning (DR) system connected to the object, the apparatus comprising:
   accelerometers for measuring a first acceleration along a moving direction of the moving object and a second acceleration along a lateral direction of the moving object;
   gyroscopes for measuring a first angular speed along the lateral direction of the moving object and a second angular speed along a lower direction of the moving object;
   a roll angle calculator for calculating a roll angle of the moving object using the second acceleration, the second angular speed, a previous speed of the moving object in the moving direction of the moving object, and a previous road inclination angle with respect to the moving direction of the moving object;
   an inclination angle calculator for calculating a road inclination angle using the calculated roll angle, the first angular speed, and the second angular speed; and
   a speed calculator for calculating a pure motion acceleration in the moving direction of the moving object using the calculated road inclination angle and for calculating the speed of the moving object using the pure motion acceleration of the moving object.

2. The apparatus of claim 1, further comprising a data storage unit for storing the calculated road inclination angle and the calculated speed in the moving direction of the moving object and for providing the previous road inclination angle and the previous speed in the moving direction of the moving object to the roll angle calculator.

3. The apparatus of claim 1, wherein the roll angle calculator uses predetermined initial values in the absence of either the previous speed in the moving direction of the moving object or the previous road inclination angle with respect to the moving direction of the moving object.

4. The apparatus of claim 1, wherein the speed calculator arranges an equation for the second acceleration to an equation for the roll angle of the moving object and substitutes the second acceleration, the second angular speed, the previous speed in the moving direction of the moving object, and the previous road inclination angle with respect to the moving direction of the moving object into the equation for the roll angle of the moving object, thereby calculating the roll angle of the moving object.

5. The apparatus of claim 1, wherein the roll angle calculator calculates a gravitational acceleration component included in the first acceleration using the road inclination angle and subtracts the gravitational acceleration component from the first acceleration, thereby calculating the pure motion acceleration in the moving direction of the moving object.

6. The apparatus of claim 1, wherein the first and second accelerations are two axis accelerations.

7. A method for measuring the speed of a moving object using a Dead Reckoning (DR) system connected to the object, the method comprising the steps of:
   measuring a first acceleration along a moving direction of the moving object and a second acceleration along a lateral direction of the moving object, the first and second accelerations are measured using a first and second accelerometer, respectively;
   measuring a first angular speed along the lateral direction of the moving object and a second angular speed along a lower direction of the moving object, the first and second angular speeds are measured using a first and second gyroscope, respectively;
   calculating a roll angle of the moving object using the second acceleration, the second angular speed, a previous speed of the moving object in the moving direction of the moving object, and a previous road inclination angle with respect to the moving direction of the moving object, the roll angle is measured using a roll angle calculator;
   calculating a road inclination angle using the calculated roll angle, the first angular speed, and the second angular speed, the road inclination angle is measured using an inclination angle calculator; and
   calculating a pure motion acceleration in the moving direction of the moving object using the calculated road inclination angle and calculating the speed of the moving object using the pure motion acceleration of the moving object, the pure motion acceleration is measured using a speed calculator.

8. The method of claim 7, further comprising storing the calculated road inclination angle and the calculated speed in the moving direction of the moving object.

9. The method of claim 7, further comprising calculating the roll angle of the moving object using predetermined initial values if there is neither the previous speed in the moving direction of the moving object nor the previous road inclination angle.

10. The method of claim 7, wherein the step of calculating the roll angle of the moving object comprises:
    arranging an equation for the second acceleration to an equation for the roll angle of the moving object;
    acquiring the second acceleration, the second angular speed, the previous speed in the moving direction of the moving object, and the previous road inclination angle with respect to the moving direction of the moving object; and
    substituting the second acceleration, the second angular speed, the previous speed in the moving direction of the moving object, and the previous road inclination angle with respect to the moving direction of the moving object into the equation for the roll angle of the moving object, thereby calculating the roll angle of the moving object.

11. The method of claim 7, wherein the step of acquiring the pure motion acceleration in the moving direction of the moving object comprises:
    acquiring a gravitational acceleration component included in the first acceleration using the road inclination angle; and
    subtracting the gravitational acceleration component from the first acceleration, thereby calculating the pure motion acceleration in the moving direction of the moving object.

12. A computer readable recording medium in which a program for executing a method of measuring the speed of a moving object in a Dead Reckoning (DR) system connected to the object is recorded, the method comprising:

measuring a first acceleration along a moving direction of the moving object and a second acceleration along a lateral direction of the moving object;

measuring a first angular speed along the lateral direction of the moving object and a second angular speed along a lower direction of the moving object;

calculating a roll angle of the moving object using the second acceleration, the second angular speed, a previous speed of the moving object in the moving direction of the moving object, and a previous road inclination angle with respect to the moving direction of the moving object;

calculating a road inclination angle using the calculated roll angle, the first angular speed, and the second angular speed; and calculating a pure motion acceleration in the moving direction of the moving object using the calculated road inclination angle and calculating the speed of the moving object using the pure motion acceleration of the moving object.

13. The method of claim 12, further comprising storing the calculated road inclination angle and the calculated speed in the moving direction of the moving object.

14. The method of claim 12, further comprising calculating the roll angle of the moving object using predetermined initial values if there is neither the previous speed in the moving direction of the moving object nor the previous road inclination angle.

15. The method of claim 12, wherein the step of calculating the roll angle of the moving object comprises:

arranging an equation for the second acceleration to an equation for the roll angle of the moving object;

acquiring the second acceleration, the second angular speed, the previous speed in the moving direction of the moving object, and the previous road inclination angle with respect to the moving direction of the moving object; and substituting the second acceleration, the second angular speed, the previous speed in the moving direction of the moving object, and the previous road inclination angle with respect to the moving direction of the moving object into the equation for the roll angle of the moving object, thereby calculating the roll angle of the moving object.

16. The method of claim 12, wherein the step of calculating the pure motion acceleration in the moving direction of the moving object comprises:

acquiring a gravitational acceleration component included in the first acceleration using the road inclination angle; and subtracting the gravitational acceleration component from the first acceleration, thereby calculating the pure motion acceleration in the moving direction of the moving object.

* * * * *